US008634630B2

(12) United States Patent
Garud et al.

(10) Patent No.: US 8,634,630 B2
(45) Date of Patent: Jan. 21, 2014

(54) METHOD AND APPARATUS FOR ENHANCING REPRESENTATIONS OF MICRO-CALCIFICATIONS IN A DIGITAL MAMMOGRAM IMAGE

(75) Inventors: Hrushikesh Garud, Parbhani (IN); Debdoot Sheet, Kharagpur (IN); Amit Suveer, Indore (IN); Manjunatha Mahadevappa, Kharagpur (IN); Ajoy Kumar Ray, Kharagpur (IN)

(73) Assignee: Texas Instruments Incorporated, Dallas, TX (US)

( * ) Notice: Subject to any disclaimer, the term of this patent is extended or adjusted under 35 U.S.C. 154(b) by 561 days.

(21) Appl. No.: 12/899,575

(22) Filed: Oct. 7, 2010

(65) Prior Publication Data
US 2012/0087565 A1  Apr. 12, 2012

(51) Int. Cl.
*G06K 9/00* (2006.01)
(52) U.S. Cl.
USPC .......................... 382/132; 382/274; 382/275
(58) Field of Classification Search
USPC .................................. 382/100, 128–132, 275
See application file for complete search history.

(56) References Cited

U.S. PATENT DOCUMENTS

| 5,572,565 | A | * | 11/1996 | Abdel-Mottaleb | ............. | 378/37 |
| 5,583,659 | A | * | 12/1996 | Lee et al. | ...................... | 358/3.13 |
| 5,586,160 | A | * | 12/1996 | Mascio | ........................... | 378/37 |
| 5,715,334 | A | * | 2/1998 | Peters | ............................ | 382/254 |
| 8,090,177 | B2 | | 1/2012 | Venkataraman et al. | ..... | 382/130 |
| 2006/0233455 | A1 | * | 10/2006 | Cheng et al. | .................... | 382/274 |
| 2009/0080741 | A1 | * | 3/2009 | Shinagawa et al. | ........... | 382/131 |
| 2011/0200238 | A1 | * | 8/2011 | Garud et al. | .................... | 382/128 |

OTHER PUBLICATIONS

Ikedo, Yuji, et al. "Computerized classification of mammary gland patterns in whole breast ultrasound images." Digital Mammography (2008): 188-195.*
Pal, Sankar K., and Robert A. King. "Image enhancement using smoothing with fuzzy sets." IEEE Transactions on Systems, Man, and Cybernetics—Part A: Systems and Humans 11.7 (1981): 494-501.*
Yu, Songyang, and Ling Guan. "A CAD system for the automatic detection of clustered microcalcifications in digitized mammogram films." Medical Imaging, IEEE Transactions on 19.2 (2000): 115-126.*
Cheng, Heng-Da, Yui Man Lui, and Rita I. Freimanis. "A novel approach to microcalcification detection using fuzzy logic technique." Medical Imaging, IEEE Transactions on 17.3 (1998): 442-450.*

* cited by examiner

*Primary Examiner* — Shefali Goradia
(74) *Attorney, Agent, or Firm* — Wade J. Brady, III; Frederick J. Telecky, Jr.

(57) ABSTRACT

Method and apparatus for enhancing representations of micro-calcifications in a digital mammogram image. The method includes smoothing the digital mammogram image using a fuzzy smoothing technique to yield a fuzzy smoothed image. The method includes subtracting the fuzzy smoothed image from the digital mammogram image to yield a micro-calcifications enhanced image. The method includes scaling gray level values of pixels in the micro-calcifications enhanced image by a predetermined amount to provide a digital mammogram image with enhanced representations of the micro-calcifications. Apparatus for enhancing representations of micro-calcifications includes an image processing unit that uses an image acquisition unit to receive an image and a digital signal processor to process the image to provide a digital mammogram image with enhanced representations of micro-calcifications.

13 Claims, 12 Drawing Sheets

METHOD AND APPARATUS FOR ENHANCING REPRESENTATIONS OF MICRO-CALCIFICATIONS IN A DIGITAL MAMMOGRAM IMAGE

TECHNICAL FIELD

Embodiments of the disclosure relate to the field of enhancement of micro-calcifications in a digital mammogram image.

BACKGROUND

A digital mammogram image represents an image of a breast. The digital mammogram image is used to detect and diagnose breast cancer. Detection of breast cancer can be defined as demonstrating presence of breast cancer using the digital mammogram image. Diagnosis of breast cancer can be defined as confirming the presence of breast cancer using the digital mammogram image. Often, tiny granules of calcium deposits are seen in the digital mammogram image. Various parameters of calcium deposits, for example, shape, size, and compactness are used to demonstrate the presence of breast cancer. Micro-calcifications are calcium deposits that are small in size, having irregular shapes, and appear compact in nature in regions of the breast. It is noted that the presence of the micro-calcifications of a certain size, shape and spatial distribution is an indication of breast cancer.

In existing techniques, there is low contrast difference between the micro-calcifications and surroundings in the digital mammogram image. Moreover, the micro-calcifications appear in different sizes and shapes making identification of the micro-calcifications inaccurate.

SUMMARY

An example of a method of enhancing representations of micro-calcifications in a digital mammogram image includes smoothing the digital mammogram image using a fuzzy smoothing technique to yield a fuzzy smoothed image. The method includes subtracting the fuzzy smoothed image from the digital mammogram image to yield a micro-calcifications enhanced image. The method also includes scaling gray level values of pixels in the micro-calcifications enhanced image by a predetermined amount to provide a digital mammogram image with enhanced representations of the micro-calcifications.

An example of a method of enhancing representations of micro-calcifications in a digital mammogram image by an image processing unit includes de-noising the digital mammogram image. The method includes determining a skinline in the digital mammogram image to yield a skinline detected image. The method includes smoothing the skinline detected image using a fuzzy smoothing technique to yield a fuzzy smoothed image. The method includes subtracting the fuzzy smoothed image from the skinline detected image to yield a micro-calcifications enhanced image. The method includes scaling gray level values of pixels in the micro-calcifications enhanced image by a predetermined amount to provide a digital mammogram image with enhanced representations of micro-calcifications.

An example of an image processing unit (IPU) for enhancing representations of micro-calcifications in a digital mammogram image includes an image acquisition unit that electronically receives the digital mammogram image. The IPU includes a digital signal processor responsive to the digital mammogram image to de-noise the digital mammogram image, determine a skinline in the digital mammogram image to yield a skinline detected image, smoothen the skinline detected image using a fuzzy smoothing technique to yield a fuzzy smoothed image, subtract the fuzzy smoothed image from the skinline detected image to yield a micro-calcifications enhanced image, and scale gray level values of pixels in the micro-calcifications enhanced image by a predetermined amount to provide a digital mammogram image with enhanced representations of micro-calcifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

Various embodiments discussed in this disclosure pertain to enhancing representations of micro-calcifications in a digital mammogram image. Micro-calcifications are calcium deposits that are small in size and irregular in shape. The presence of the micro-calcifications of certain size, shape and spatial distribution is an indication of breast cancer. Typically, the micro-calcifications are identified by a radiologist by visual analysis of the digital mammogram image. However, visual analysis is prone to human error. Often, computer aided detection (CADe) systems are used to detect micro-calcifications in the digital mammogram image. However, similarity in manifestation of the micro-calcifications with surrounding tissues makes image segmentation using the CADe systems difficult. Moreover, artifacts that arise during image processing may mask or distort the micro-calcifications making detection of the micro-calcification even more difficult. The present disclosure addresses the aforementioned problems.

Figure 1:
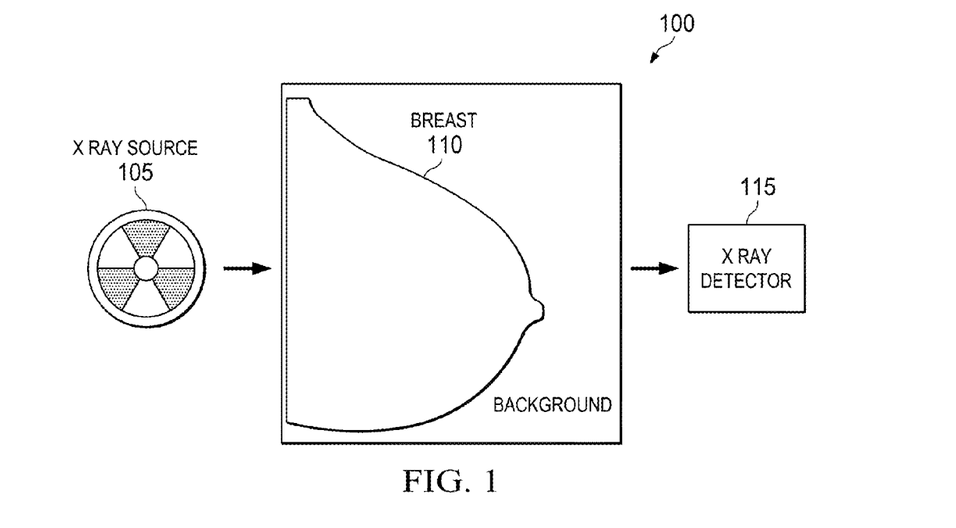
FIG. 1 illustrates an environment for generating a digital mammogram image including representations of micro-calcifications, according to which various embodiments can be implemented.

An environment 100 for generating a digital mammogram image including representation of micro-calcifications is shown in FIG. 1. The environment 100 includes an x-ray source 105, an x-ray detector 115, and a breast 110 placed between the x-ray source 105 and the x-ray detector 115. In one example, the x-ray source 105 can be a linear accelerator that generates x-rays by accelerating electrons. The x-ray detector 115 detects the x-rays and generates the digital mammogram image of the breast 110. Examples of the x-ray detector 115 include, but are not limited to, a photographic plate, a Geiger counter, a scintillator, and a semiconductor detector. In an embodiment, the digital mammogram image generated by the x-ray detector 115 is used for enhancing representations of micro-calcifications.

Figure 2:
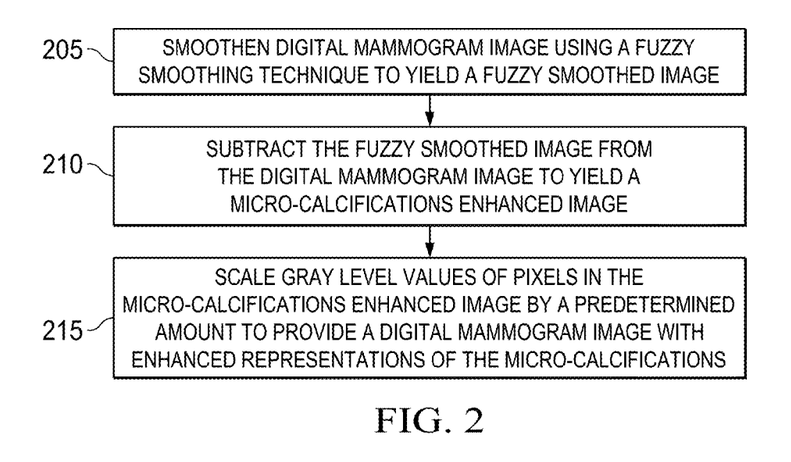
FIG. 2 illustrates a flowchart for enhancing representations of micro-calcifications in a digital mammogram image, in accordance with an embodiment.
Figure 3:
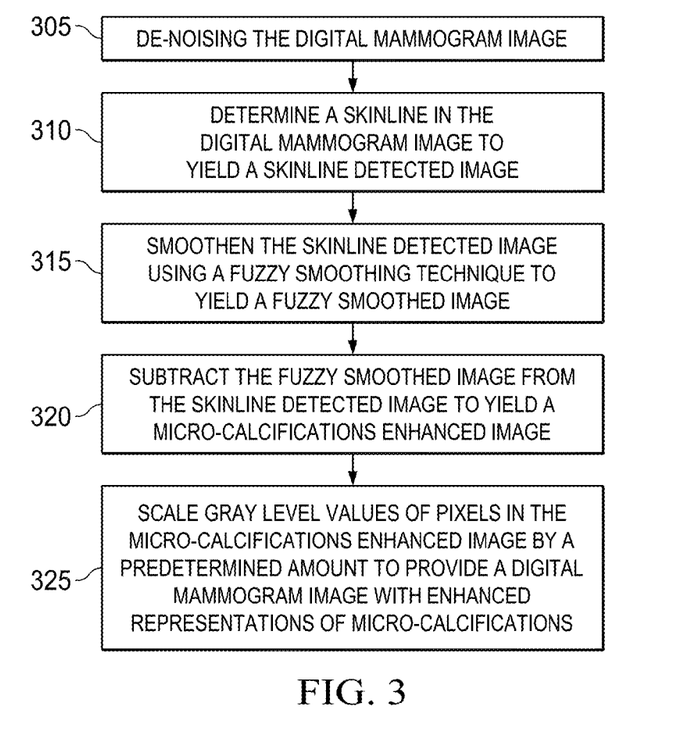
FIG. 3 illustrates a flowchart for enhancing representations of micro-calcifications in a digital mammogram image, in accordance with an embodiment.
Figure 4:
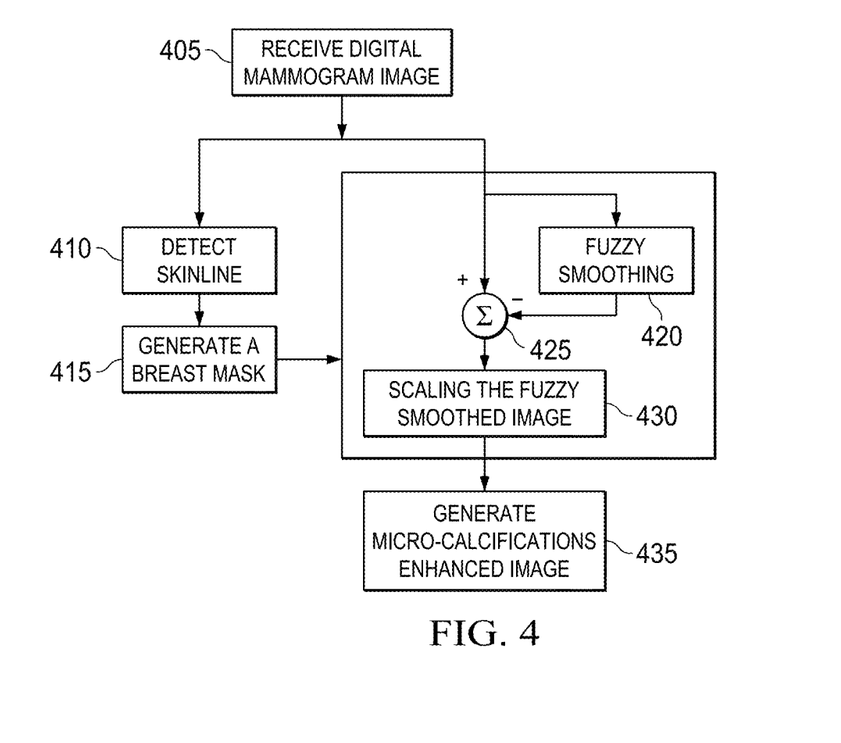
FIG. 4 illustrates a flowchart of a process for enhancing representations of micro-calcifications in a digital mammogram image, in accordance with an embodiment.

Various embodiments for enhancing representations of micro-calcifications in the digital mammogram image are explained in conjunction with FIG. 2, FIG. 3, and FIG. 4.

Referring to FIG. 2 now, various steps involved in enhancing representations of micro-calcifications in a digital mammogram image are illustrated. At step 205, the digital mammogram image is smoothed using a fuzzy smoothing technique to yield a fuzzy smoothed image. At step 210, the fuzzy smoothed image is subtracted from the digital mammogram image to yield micro-calcifications enhanced image. At step 215, gray level values of pixels in the micro-calcifications enhanced image are scaled by a predetermined amount to provide a digital mammogram image with enhanced representations of the micro-calcifications.

Each of the foregoing steps will now be explained in more detail. First, the fuzzy smoothing technique will be described.

Micro-calcifications tend to be among brightest object in the digital mammogram image. However, the micro-calcifications may be present in the regions of high average gray levels and thus be difficult to perceive. Generally due to small size, the micro-calcifications appear as spikes in a flat background in the digital mammogram image. When such a digital mammogram image with micro-calcifications is smoothed, the spikes are removed. If the smoothing step is followed by subtraction of the smoothed image from an original image, the resultant output image contains enhanced micro-calcifications having greater contrast with the neighboring tissue structure. The original image is also referred to as an input image or the digital mammogram image. A generic formula for obtaining a micro-calcified image is as shown in equation 1:

Micro-calcifications Enhanced Image=(Input Image− Smoothed mage)    (1)

The fuzzy smoothing technique uses a fuzzy spatial filter to smoothen gray level values of pixels in the digital mammogram image. Conventional spatial filters use an averaging procedure, hereinafter referred to as averaging, to generate the smoothed image. In averaging based on conventional spatial filters, weights assigned to neighborhood pixels are crisp and the weights do not depend on image data. Such a conventional filter when used for micro-calcification enhancement leads to limited intensification of the micro-calcifications and little contrast enrichment.

A fuzzy spatial filter according to an embodiment uses a convolution mask whose weights change according to the image data and which performs better than the conventional spatial filters. The fuzzy smoothing technique includes averaging gray level values of pixels in the digital mammogram image using a fuzzy spatial filter. The averaging of the gray level values includes selecting those pixels that lie within a predefined neighborhood of a center pixel, the predefined neighborhood herein referred as a predefined window. The predefined window can be square shaped and of size n×n. In one example, the predefined window is of size 5×5 pixels. In another example, the predefined window is of size 7×7 pixels. In averaging using the fuzzy spatial filter, the weights change based on the effect of the difference between the gray level value of the center pixel and that of another pixel in the predefined window and the physical distance between the center pixel and the neighborhood pixel. The size of the predefined window depends on the size of micro-calcifications of interest.

An example of a 5×5 window in a digital mammogram image is as shown below.

| 90 | 83 | 76 | 74 | 67 |
| 86 | 81 | 72 | 70 | 63 |
| 76 | 73 | 64 | 57 | 58 |
| 70 | 67 | 60 | 54 | 55 |
| 70 | 66 | 64 | 56 | 49 |

It is noted that the center pixel has a gray level value of 64.

Averaging based on the fuzzy spatial filter includes determining a membership function for each pixel in the window. The membership function of a given pixel is based on a difference in gray level value between the center pixel and the given pixel, and a distance between the center pixel and the given pixel. Contribution of the given pixel in a certain neighborhood would decrease as it becomes increasingly different from that of the center pixel. This principle is used to define the fuzzy membership values for the pixels in the neighborhood. These membership values, in turn, serve as the weights in the averaging of the pixels in the neighborhood. In one example, as a pixel moves away from the center pixel the membership value would decrease. In another example, if the pixel has large difference of gray value from that of the center pixel, the membership value would become lower. In one example, the membership function can be modeled as a double bell shaped curve. Let the gray level of the pixel at location (m, n) be given by $x_{mn}$. If the center pixel gray level be given by $x_c$, then the membership value $\mu(x_{ij})$ of any pixel in the neighborhood of $x_c$ is given by equation 2:

$$\mu(x_{ij}) = \exp\left[\frac{-(x_c - x_{ij})^2}{\alpha}\right] \times \exp\left[\frac{-d^2}{\beta}\right] \quad (2)$$

where, d is the distance between the center pixel $x_c$ and the neighboring pixel $x_{ij}$ and $\alpha$, $\beta$ are two scaling factors which determine the extent of flatness of the membership function. The value of alpha is the gray level difference between center pixel and the pixel in neighborhood for which value of the first exponent drops to 0.37 (half power). The value of beta is the distance between center pixel and the pixel in neighborhood for which value of the second exponent drops to 0.37 (half power). In the averaging, the membership values themselves serve as the weights of the gray levels of the pixels in the neighborhood.

Substituting $\alpha=64$ and $\beta=10$, the membership function of pixels for the 5×5 window obtained from equation 2 is shown below:

$$\begin{matrix} 0 & 0.0014 & 0.707 & 0.0852 & 0.1754 \\ 0.002 & 0.0073 & 0.3329 & 0.3819 & 0.4003 \\ 0.0707 & 0.2552 & 1 & 0.4208 & 0.3819 \\ 0.2317 & 0.5824 & 0.7047 & 0.1405 & 0.1147 \\ 0.115 & 0.3819 & 0.6703 & 0.1496 & 0.006 \end{matrix}$$

It is noted that the values $\alpha=64$ and $\beta=10$ are exemplary values. In some embodiments, the values of $\alpha$ and $\beta$ can vary.

Further, the averaging includes modifying gray level value of the center pixel based on membership functions of each of the plurality of pixels. Modifying the gray level value is performed based on equation 3:

$$x'_c = \frac{|\sum \mu_{ij} \times x_{ij}|}{|\sum \mu_{ij}|}, (i, j) \in N, x_{ij} \neq x_c \quad (3)$$

Modifying the gray level value includes multiplying the gray level value of each pixel by the membership function of that pixel to yield a modified gray level value of that pixel. The modified gray level values of each pixel in the plurality of pixels are summed to yield a modified gray level value of the plurality of pixels. A modulus of the modified gray level value of the plurality of pixels is determined. The membership functions of the plurality of pixels are summed to yield a modified membership function. A modulus of the modified membership function is determined. The modulus of the modified gray level value of the plurality of pixels is divided by the modulus of the modified membership function to yield a modified gray level value of the center pixel.

An example of a modified gray value of a center pixel based on the averaging is 65.67242.

Having obtained the fuzzy smoothed image, now that image is subtracted from the digital mammogram image or the input image.

Micro-calcifications enhanced Image=(Input Image−
Fuzzy Smoothed Image)

Next, the gray scale values in the image that results from the subtraction are scaled by a predetermined factor.

Micro-calcifications enhanced Image=A×(Input Image−Fuzzy Smoothed Image), where A is the predetermined amount. In example, A is determined to be 2.

Referring to FIG. 3 now, various steps involved in enhancing representations of micro-calcifications in a digital mammogram image are illustrated.

At step 305, the digital mammogram image is de-noised. The de-noising includes removing speckle noise and salt-pepper noise associated with the digital mammogram image by filtering with a median filter.

At step 310, a skinline in the digital mammogram image is determined. The skinline can be defined as a demarcation line that separates a breast region from a background region in the digital mammogram image. When the skinline has been determined, it is used to define a skinline detected image.

At step 315, the skinline detected image is smoothed using a fuzzy smoothing technique as described above to yield a fuzzy smoothed image.

At step 320, the fuzzy smoothed image is subtracted from the skinline detected image to yield a micro-calcifications enhanced image.

At step 325, gray level values of pixels in the micro-calcifications enhanced image are scaled by a predetermined amount as described above to provide a digital mammogram image with enhanced representations of micro-calcifications.

FIG. 4 illustrates a flowchart of a process for enhancing representations of micro-calcifications in a digital mammogram image.

As described above with reference to FIG. 2, at step 420, fuzzy smoothing is performed. The resulting fuzzy smoothed image is subtracted at step 425 from the digital mammogram image to yield a micro-calcification enhanced image, and this image is scaled at step 430 to generate at step 435 the digital mammogram image with enhanced representations of micro-calcification.

In some embodiments, a skinline is first detected in the digital mammogram image before enhancing the micro-calcifications. The skinline detection is explained in steps 405, 410, and 415.

At step 405, a digital mammogram image is received.

At step 410, skinline is detected in the digital mammogram image. To do this, the digital mammogram image is first de-noised. The digital mammogram image is then smoothed to yield a smoothed image. A gradient in the digital mammogram image is identified. This yields a gradient map. The digital mammogram image is filtered based on a homomorphic filtering technique to yield a homomorphic filtered image. The breast region is extracted from the digital mammogram image based on the smoothed image and the gradient map using a fuzzy-rule-based pixel classification to yield a binary image. The binary image is filtered to remove noise and to yield a filtered image. The binary image can be filtered using morphological filtering techniques. A boundary of the breast region is extracted, for example by morphological boundary extraction techniques. The skinline is then detected using an active contour technique. The detection of a skinline using the active contour technique is explained in US co-pending patent application Ser. No. 12705984, entitled "Method and system for determining skinline in digital mammogram images", assigned to Texas Instrument Incorporated, which is incorporated herein by reference in its entirety.

At step 415, a breast mask is generated. The breast mask includes a marked skinline. The breast mask is further used to detect micro-calcifications and enhance representations of the micro-calcifications in the digital mammogram image.

Figure 5:
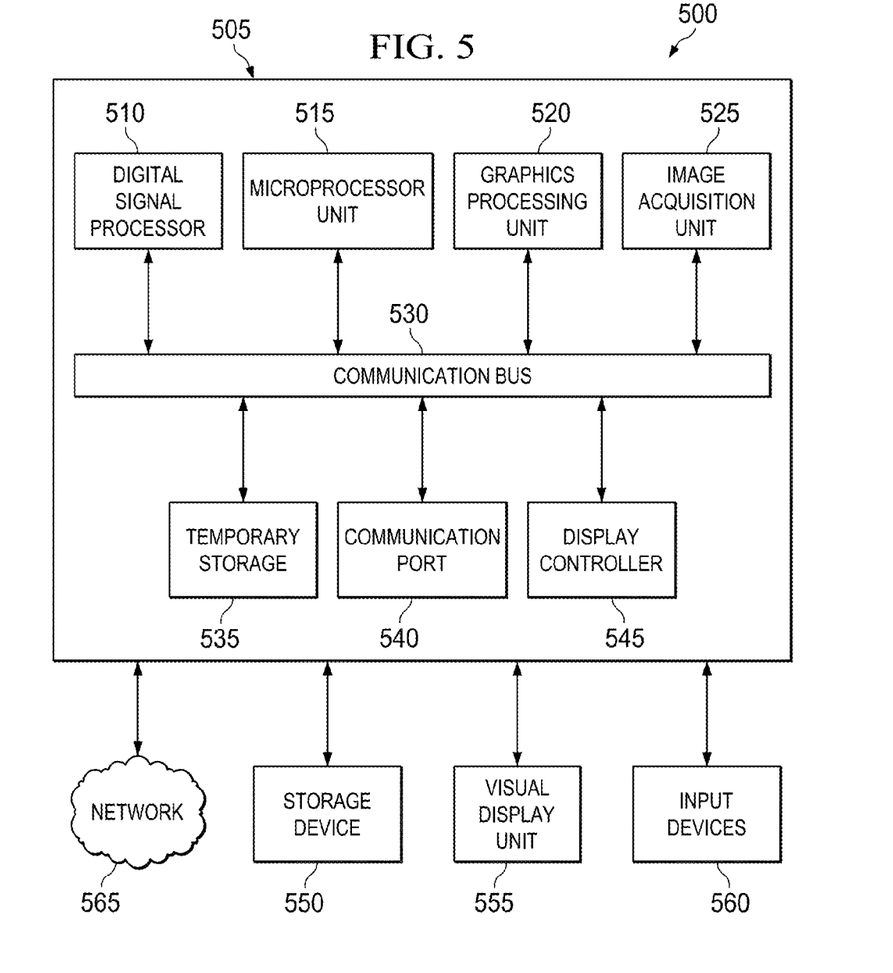
FIG. 5 illustrates a block diagram of a system for enhancing representations of micro-calcifications in a digital mammogram image, in accordance with an embodiment.

FIG. 5 illustrates a block diagram of a system 500 for enhancing representations of micro-calcifications in a digital mammogram image.

The digital mammogram image, for example as provided by the X-ray detector 115 of FIG. 1, is received in an image processing unit (IPU) 505. The various processing units in the IPU 505 include, but are not limited to a digital signal processor (DSP) 510, a microprocessor unit (MPU) 515, and a graphics processing unit (GPU) 520.

An image acquisition unit 525 electronically receives the digital mammogram image. In one example, the image acquisition unit 525 can be a video processing subsystem (VPSS).

The DSP 510 is coupled to a communication bus 530. The DSP 510 receives the image of a breast and processes the image to yield the digital mammogram image. The MPU 515 and the GPU 520 processes the image in conjunction with the DSP 510. The GPU 520 can process image graphics. The MPU 515 controls operation of components in the IPU 505 and includes instructions to perform processing of the image on the DSP 510.

The IPU 505 includes a communication port 540 in electronic communication with other devices, for example a storage device 550, a visual display unit 555, and one or more input devices 560. Examples of an input device include, but are not limited to a keyboard, a mouse, a touch screen through which a user can provide an input. The storage device 550 stores the digital mammogram image. The visual display unit 555 is used to display enhanced representations of the micro-calcifications in the digital mammogram image. The IPU 505 can also be in electronic communication with a network 565 to transmit and receive data including images. The communication port 540 can also be coupled to the IPU 505 through a switched central resource, for example the communication bus 530. The communication bus 530 can be a group of wires or a hardwire used for switching data between the peripherals or between any component in the IPU 505. The IPU 505 can also be coupled to other devices for example at least one of the storage device 550 and the visual display unit 555 through the communication bus 530. The IPU 505 can also include a temporary storage 535 and a display controller 545. The temporary storage 535 stores temporary information. An example of the temporary storage 535 is a random access memory.

The storage device 550 and the visual display unit 555 can be used for outputting result of processing. In some embodiments, the DSP 530 also processes a micro-calcifications detected breast image and is used for breast lesion detection and diagnosis. The DSP 530 also generates the abnormality marked image, which can then be displayed, transmitted or stored, and observed. The abnormalities marked image is displayed on the visual display unit 555 using a display controller 545.

Figure 6A:
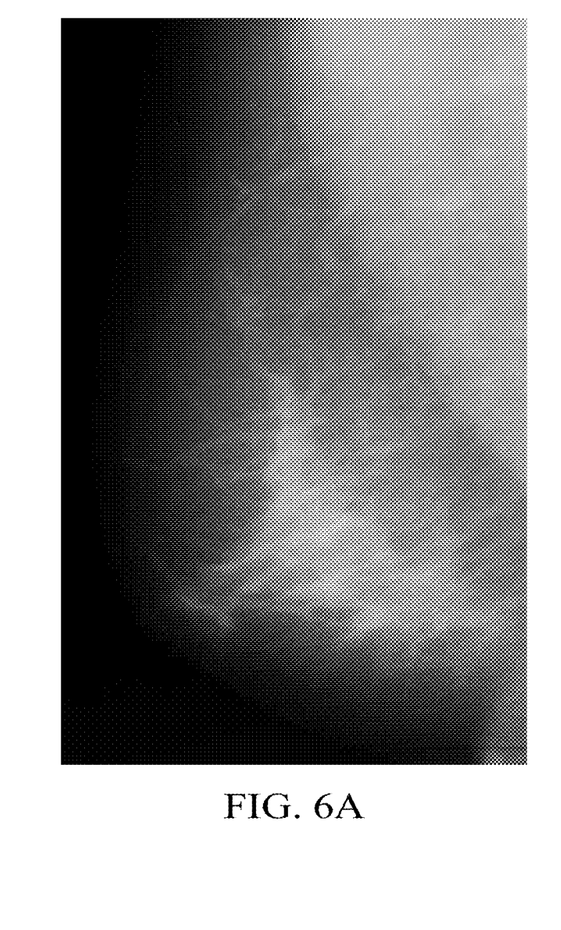
FIG. 6A is an exemplary illustration of a digital mammogram image before enhancing representations of micro-calcifications.
Figure 6B:
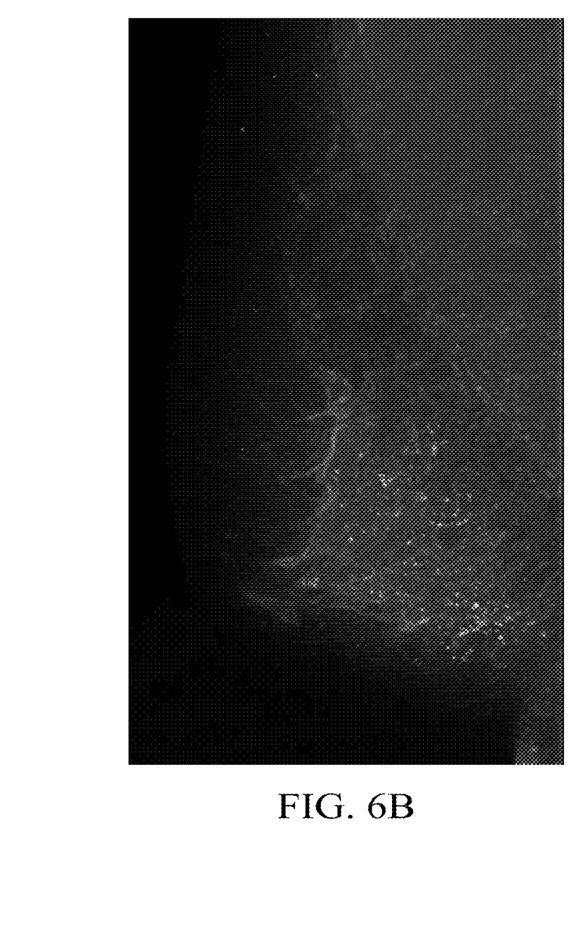
FIG. 6B is an exemplary illustration of a digital mammogram image after enhancing representations of micro-calcifications.
Figure 7A:
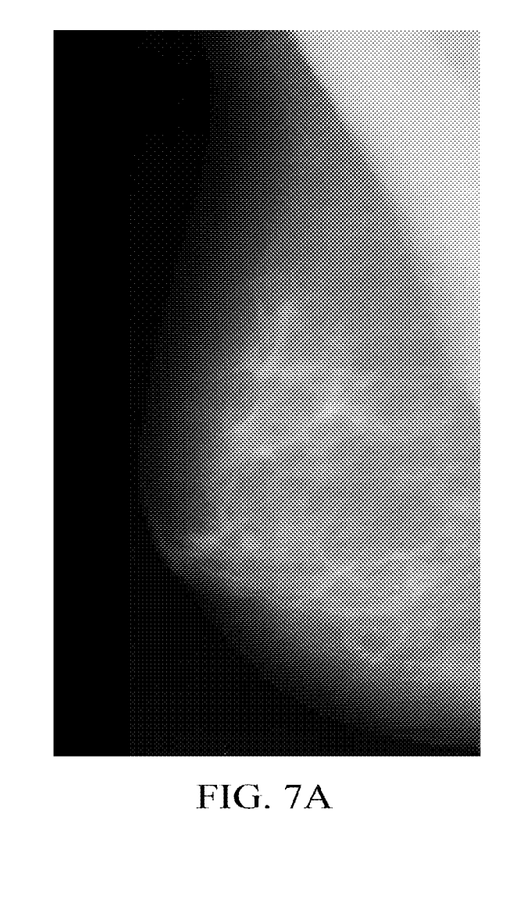
FIG. 7A is an exemplary illustration of a digital mammogram image before enhancing representations of micro-calcifications.
Figure 7B:
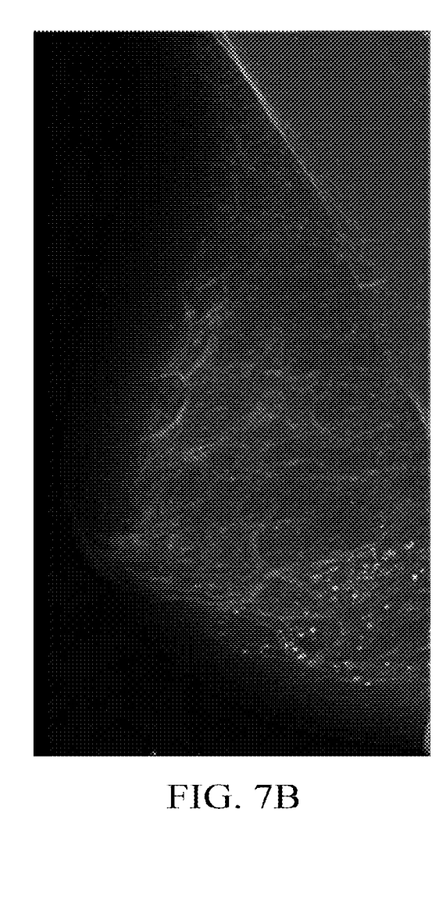
FIG. 7B is an exemplary illustration of a digital mammogram image after enhancing representations of micro-calcifications.
Figure 8A:
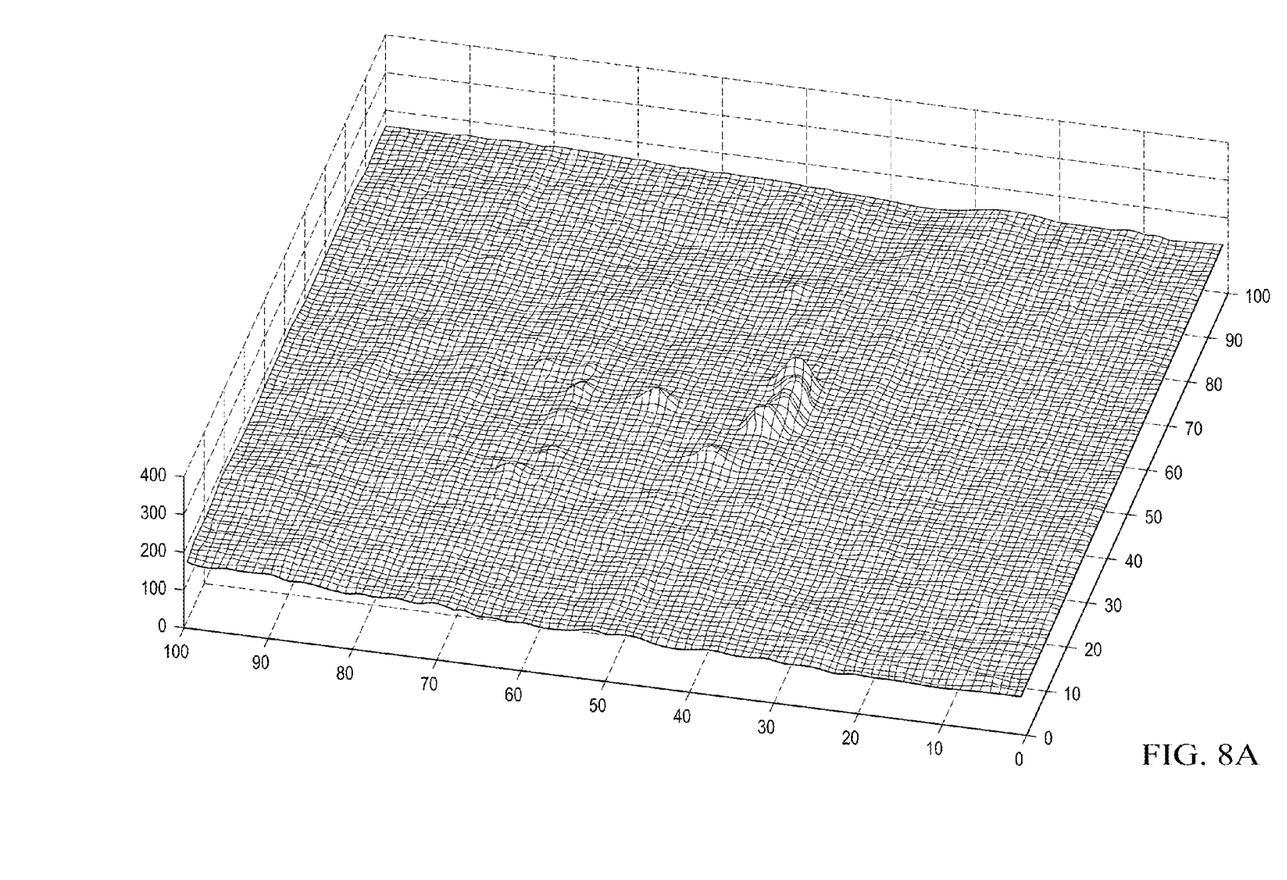
FIG. 8A is a graphical representation illustrating gray level values of a digital mammogram image before enhancing representations of micro-calcifications.
Figure 8B:
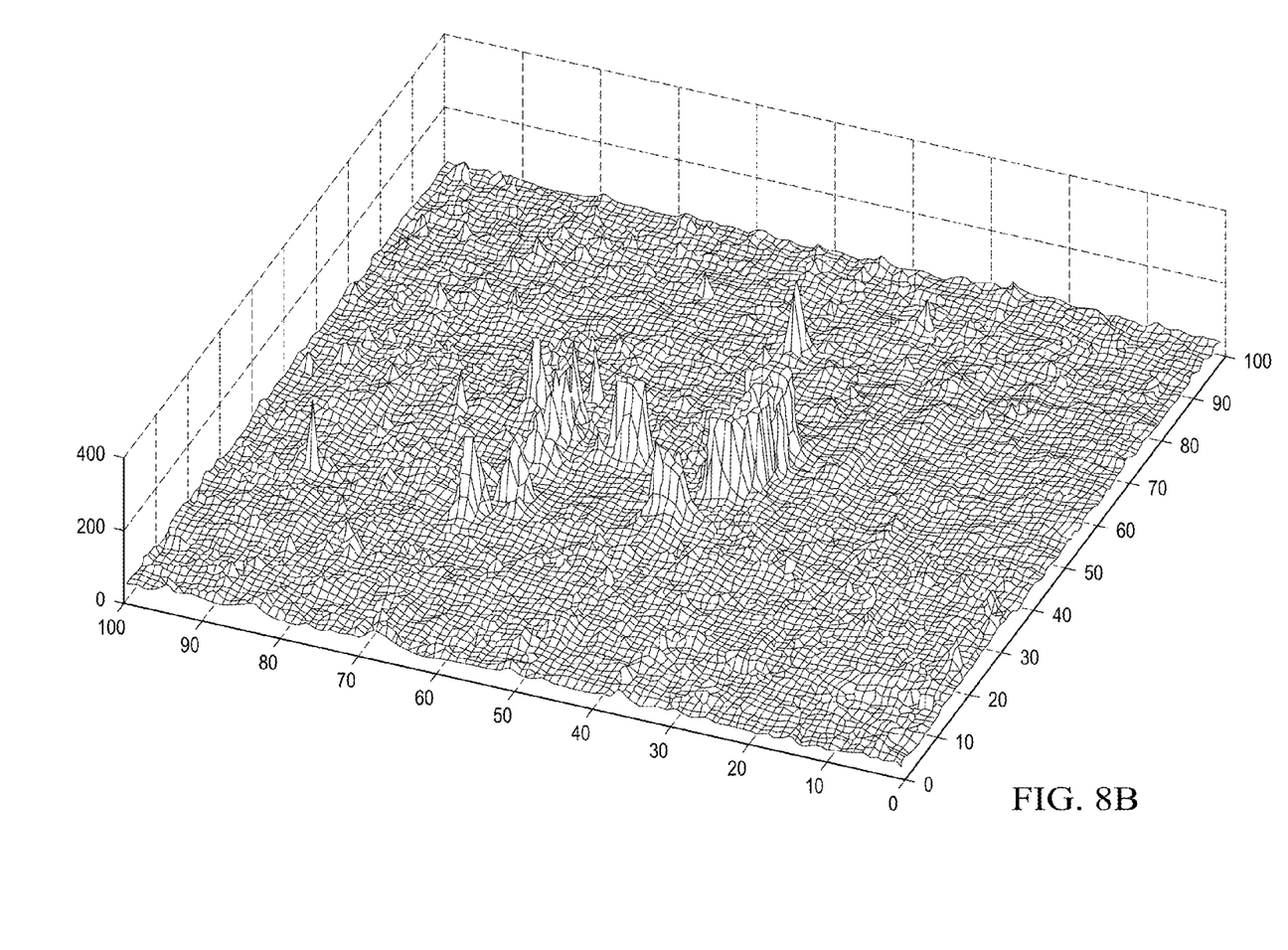
FIG. 8B is a graphical representation illustrating gray level values of a digital mammogram image after enhancing representations of micro-calcifications.
Figure 9A:
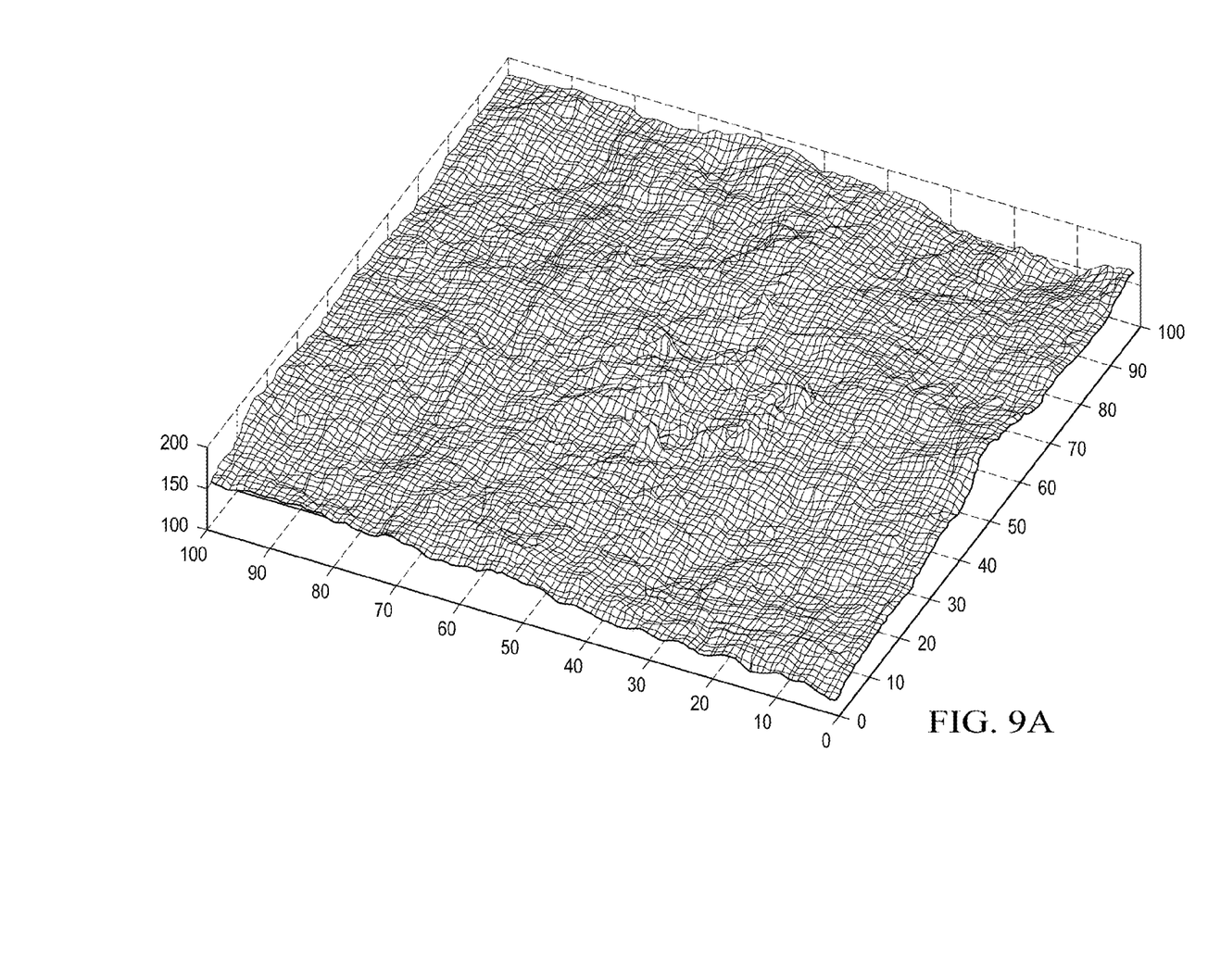
FIG. 9A is a graphical representation illustrating gray level values of a digital mammogram image before enhancing representations of micro-calcifications.
Figure 9B:
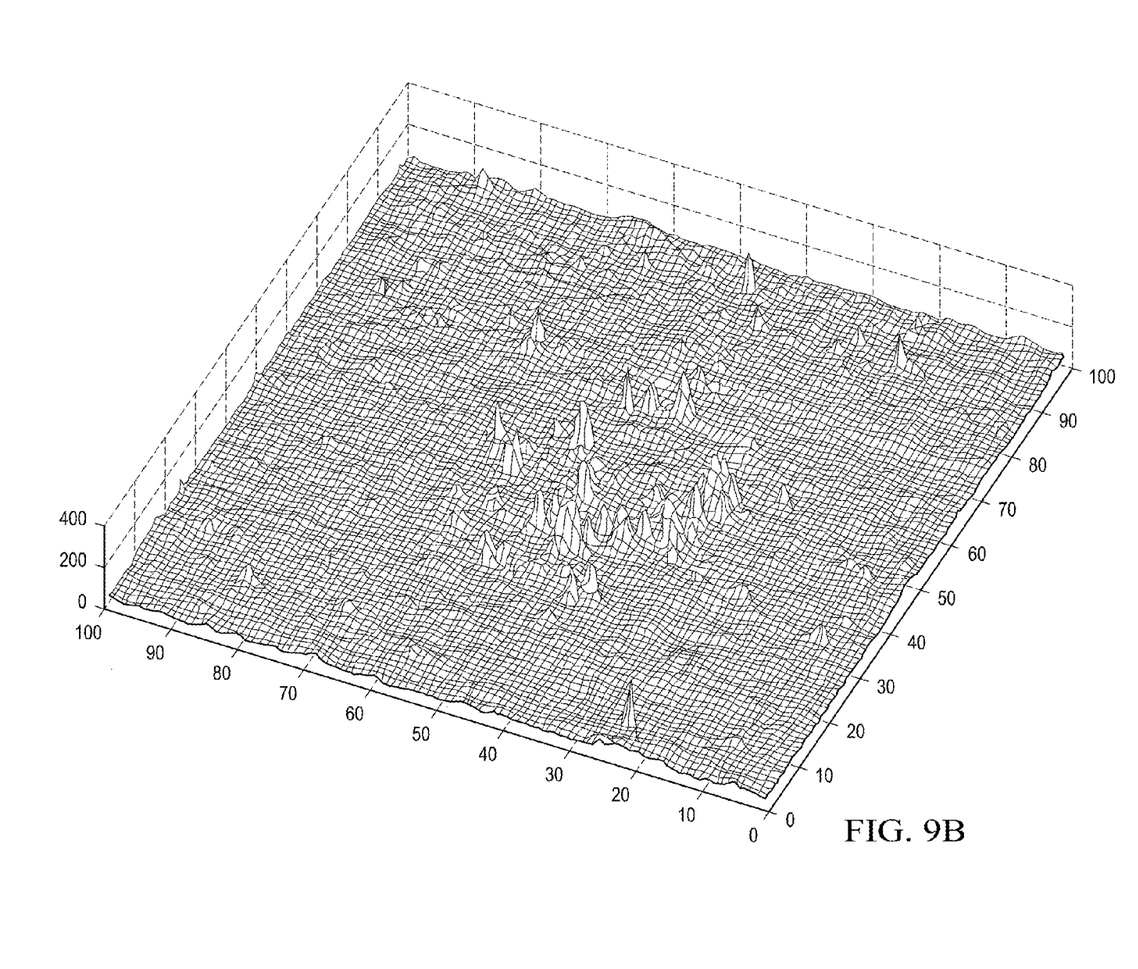
FIG. 9B is a graphical representation illustrating gray level values of a digital mammogram image after enhancing representations of micro-calcifications.
Figure 10A:
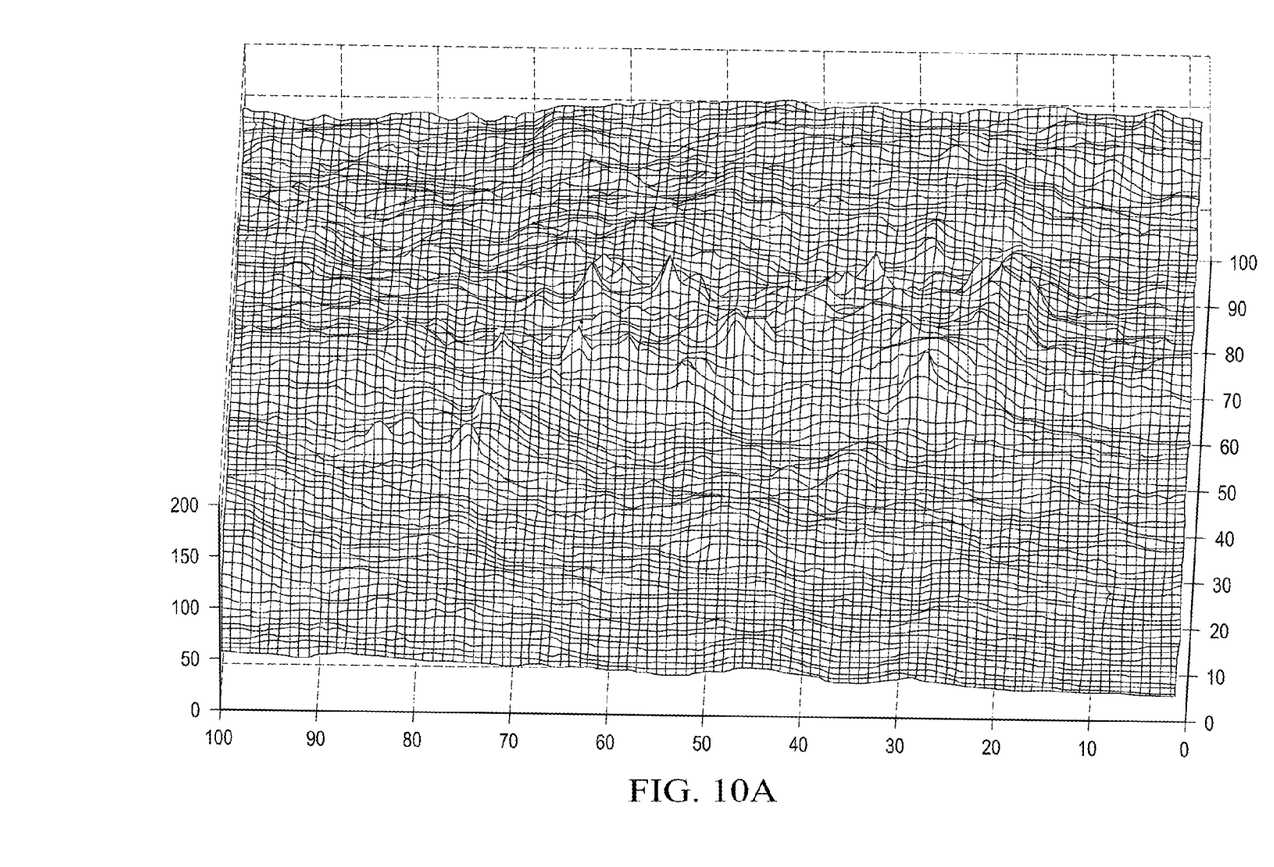
FIG. 10A is a graphical representation illustrating gray level values of a digital mammogram image before enhancing representations of micro-calcifications.
Figure 10B:
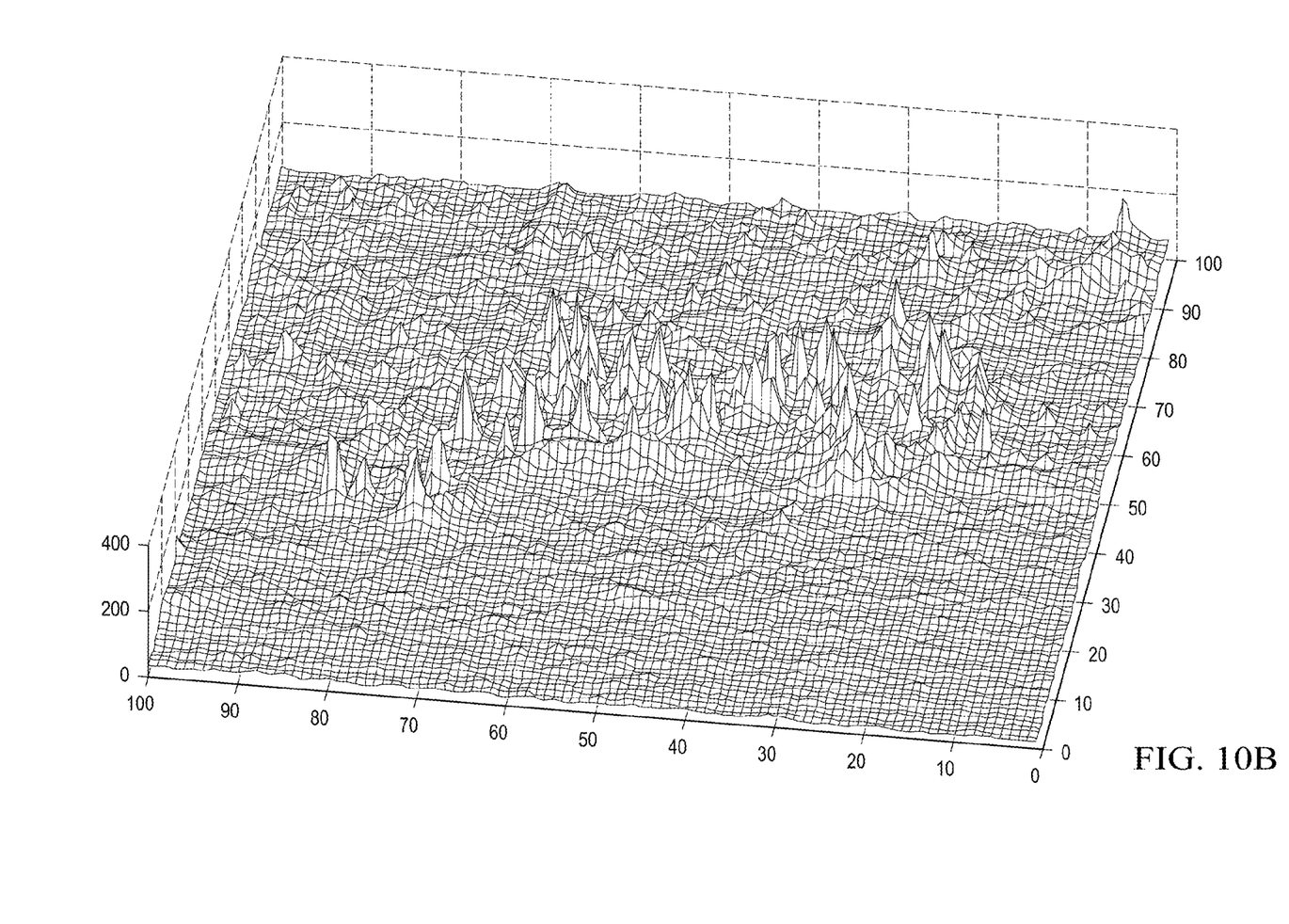
FIG. 10B is a graphical representation illustrating gray level values of a digital mammogram image after enhancing representations of micro-calcifications.

FIG. 6A is an exemplary illustration of a digital mammogram image before enhancement and FIG. 6B is an exemplary illustration of the same digital mammogram image after enhancing representations of micro-calcifications using a fuzzy smoothing technique according to an embodiment of the invention. Likewise, each of FIG. 7A is an exemplary illustration of a digital mammogram image before enhancement, and FIG. 7B is an exemplary illustration of the same images after enhancing representations of micro-calcifications using the fuzzy smoothing technique. FIGS. 8A, 9A and 10A are graphical representations illustrating gray values before enhancement, and FIGS. 8B, 9B and 10B are graphical representations illustrating gray values after enhancing representations of micro-calcifications using the fuzzy smoothing technique. The digital mammogram images after enhancing representations of the micro-calcifications are further used to detect breast cancer.

Fuzzy smoothing of the digital mammogram image enhances the micro-calcification from original image. The use of fuzzy spatial filtering for smoothing will help in achieving greater enhancement of micro-calcifications and thereby will assist in early detection of breast cancer.

In the foregoing discussion, each of the terms "coupled" and "connected" refers to either a direct electrical connection or mechanical connection between the devices connected or an indirect connection through intermediary devices.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A method of enhancing representations of micro-calcifications in a digital mammogram image, the method comprising:

smoothing the digital mammogram image using a fuzzy smoothing technique to yield a fuzzy smoothed image, wherein smoothing comprises averaging gray level values of pixels in the digital mammogram image and wherein averaging gray level values comprises:

selecting a plurality of pixels around a center pixel, wherein the plurality of pixels along with the center pixel are within a window having a predefined window size;

determining a membership function of a pixel in the plurality of pixels; and modifying a gray level value of the center pixel based on the membership functions of each of the plurality of pixels;

subtracting the fuzzy smoothed image from the digital mammogram image to yield a micro-calcifications enhanced image; and scaling gray level values of pixels in the micro-calcifications enhanced image by a predetermined amount to provide a digital mammogram image with enhanced representations of the micro-calcifications.

2. The method as claimed in claim 1, wherein the membership function of a given pixel is based on
a difference in gray level value between the center pixel and the given pixel, and
a distance between the center pixel and the given pixel.

3. The method as claimed in claim 1, wherein modifying the gray level value of the center pixel comprises:

multiplying the gray level value of each pixel by the membership function of that pixel to yield a modified gray level value of that pixel;

summing the modified gray level values of the selected pixels to yield a modified gray level value of all of the selected pixels;

determining a modulus of the modified gray level value of all of the selected pixels;

summing the membership functions of the selected pixels to yield a modified membership function;

determining a modulus of the modified membership function; and dividing the modulus of the modified gray level value of all the selected pixels by the modulus of the modified membership function to yield a modified gray level value of the center pixel.

4. The method as claimed in claim 1, wherein the method is performed in an image processing unit that is
electronically coupled to a source of the digital mammogram image.

5. The method as claimed in claim 1 and further comprising de-noising the digital mammogram image.

6. The method as claimed in claim 5, wherein de-noising the digital mammogram image comprises using a median filter to attenuate speckle noise and salt-pepper noise associated with the digital mammogram image.

7. The method as claimed in claim 6 and further comprising determining a skinline in the digital mammogram image.

8. A method of enhancing representations of micro-calcifications in a digital mammogram image by an image processing unit, the method comprising:
   de-noising the digital mammogram image;
   determining a skinline in the digital mammogram image to yield a skinline detected image;
   smoothing the skinline detected image using a fuzzy smoothing technique to yield a fuzzy smoothed image, wherein smoothing comprises averaging gray level values of pixels in the digital mammogram image and wherein averaging gray level values comprises:
      selecting a plurality of pixels around a center pixel, wherein the plurality of pixels along with the center pixel are within a window having a predefined window size;
      determining a membership function of a pixel in the plurality of pixels; and
      modifying a gray level value of the center pixel based on the membership functions of each of the plurality of pixels;
   subtracting the fuzzy smoothed image from the skinline detected image to yield a micro-calcifications enhanced image; and
   scaling gray level values of pixels in the micro-calcifications enhanced image by a predetermined amount to provide a digital mammogram image with enhanced representations of micro-calcifications.

9. The method as claimed in claim 8, wherein the membership function of a given pixel in the plurality of pixels is based on
   a difference in gray level value between the center pixel and the given pixel, and
   a distance between the center pixel and the given pixel.

10. The method as claimed in claim 8, wherein modifying the gray level value of the center pixel comprises:
    multiplying the gray level value of each pixel by the membership function of that pixel to yield a modified gray level value of that pixel;
    summing the modified gray level values of the selected pixels to yield a modified gray level value of all of the selected pixels;
    determining a modulus of the modified gray level value of all of the selected pixels;
    summing the membership functions of the selected pixels to yield a modified membership function;
    determining a modulus of the modified membership function; and
    dividing the modulus of the modified gray level value of all the selected pixels by the modulus of the modified membership function to yield a modified gray level value of the center pixel.

11. An image processing unit (IPU) for enhancing representations of micro-calcifications in a digital mammogram image, the IPU comprising:
    an image acquisition unit that electronically receives the digital mammogram image; and
    a digital signal processor (DSP) responsive to the digital mammogram image to de-noise the digital mammogram image,
       determine a skinline in the digital mammogram image to yield a skinline detected image,
       smoothen the skinline detected image using a fuzzy smoothing technique to yield a fuzzy smoothed image, wherein smoothen comprises the DSP being configured to average gray level values of pixels in the digital mammogram image and wherein configured to average gray level values comprises the DSP being further configured to:
          select a plurality of pixels around a center pixel, wherein the plurality of pixels along with the center pixel are within a window having a predefined window size;
          determine a membership function of a pixel in the plurality of pixels; and
          modify a gray level value of the center pixel based on the membership functions of each of the plurality of pixels;
       subtract the fuzzy smoothed image from the skinline detected image to yield a micro-calcifications enhanced image, and
       scale gray level values of pixels in the micro-calcifications enhanced image by a predetermined amount to provide a digital mammogram image with enhanced representations of micro-calcifications.

12. The IPU as claimed in claim 11 and further comprising:
    a microprocessor unit that controls execution of instructions to perform processing of the digital mammogram image;
    a visual display unit that displays the digital mammogram image with enhanced representations of micro-calcifications; and
    a display controller in communication with the display unit.

13. The IPU as claimed in claim 11, wherein the IPU is electronically coupled to at least one of:
    an x-ray source that generates x-rays;
    an image detector that detects the x-rays and generates the digital mammogram image;
    a visual display unit that displays the digital mammogram image with enhanced representations of micro-calcifications;
    a storage device that stores the digital mammogram image; and
    a network that enables reception and transmission of the digital mammogram image.

* * * * *